(12) United States Patent
McAfee et al.

(10) Patent No.: US 6,510,211 B1
(45) Date of Patent: Jan. 21, 2003

(54) METHOD AND APPARATUS FOR REMOTE FAX FORWARDING CONTROL

(75) Inventors: David A. McAfee, Spring, TX (US); John C. Barker, Houston, TX (US); Derrill L. Sturgeon, Spring, TX (US); Christopher A. Howard, Houston, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 59 days.

(21) Appl. No.: 09/691,683

(22) Filed: Oct. 18, 2000

(51) Int. Cl.$^7$ .............................................. H04M 11/00
(52) U.S. Cl. .............. 379/100.09; 358/407; 379/102.02
(58) Field of Search ...................... 379/100.08–100.12, 379/100.01, 100.06, 100.14, 102.01, 102.02; 358/400–403, 407, 442, 468, 434, 440

(56) References Cited

U.S. PATENT DOCUMENTS

| | | | |
|---|---|---|---|
| 4,918,722 A | * | 4/1990 | Duehren et al. |
| 5,055,945 A | * | 10/1991 | Oguma et al. |
| 5,068,888 A | * | 11/1991 | Scherk et al. |
| 5,090,049 A | * | 2/1992 | Chen |
| RE34,429 E | * | 11/1993 | Baran et al. |
| 5,764,738 A | * | 6/1998 | Gillon et al. |
| 5,802,261 A | * | 9/1998 | Yokoyama |
| 5,838,460 A | * | 11/1998 | Nonomura |
| 5,841,843 A | * | 11/1998 | Bristow et al. |
| 6,088,127 A | * | 7/2000 | Pieterse |

FOREIGN PATENT DOCUMENTS

WO    WO 91/03115    * 3/1991

OTHER PUBLICATIONS

*RightFax Enterprise Server Features*, RightFAX, http://www.rightfax.com/prodcuts/ent feat.htm, (Oct. 14, 2000), pp. 1–2.
*Faxination for Microsoft Exchange*, Fenestrae®, http://www.amrein.com/EXCHANGE/fenestra.htm, (Oct. 14, 2000), pp. 1–4.
*A1500 All–In–One*, Compaq.com, http://athome.compaq.com/default.asp?page=showroom&showroompage=%2fOptionCompone nts.asp%3ftab%3d0%26CategoryId%3d59, (Oct. 13, 2000), 6 pages.
*Compaq's New Imaging Products and Presario PCs Combine the Power of the Internet with Tools to Unleash the Imagination*, Compaq.com, http://www5.compaq.com/newsroom/pr/2000/pr2000100401.html, (Oct. 13, 2000), pp. 1–4.
*A1000*, Compaq.com, http://athome.compaq.com/default.asp?page=showroom&showroompage=%2fOptionCompone nts.asp%3ftab%3d0%26CategoryId%3d59, (Oct. 13, 2000), 6 pages.

(List continued on next page.)

Primary Examiner—Wing Chan
(74) Attorney, Agent, or Firm—Akin Gump Strauss Hauer & Feld LLP

(57) ABSTRACT

A facsimile machine provides firmware to remotely activate and deactivate fax forwarding. The firmware enables a user to remotely activate or deactivate fax forwarding through an email, fax, or a telephone. The facsimile machine may be set by the user to activate and deactivate fax forwarding at a predetermined activation time and a predetermined deactivation time. If fax forwarding with local printing is activated, the facsimile machine locally prints a fax after the fax is forwarded. The facsimile machine may be a multifunctional peripheral.

31 Claims, 13 Drawing Sheets

OTHER PUBLICATIONS

*eFax Free*, eFax.com, http://www.efax.com/products/free/, (Oct. 15, 2000), 5 pages.

*eFax Plus*, eFax.com, http://www.efax.com/products/plus/, (Oct. 15, 2000), 6 pages.

*About eFax.com*, eFax.com, http://www.efax.com/aboutus/, (Oct. 15, 2000), 1 page.

*Send Faxes From Any Web Connection Using PC, Mac, UNIX or Linux*, eFax.com, http://www.efax.com/send4web/, (Oct. 15, 2000), 1 page.

*eFax Corporate*, eFax.com, http://www.efax.com/products/corporate/index.html, (Oct. 15, 2000), 3 pages.

*Frequently Asked Questions*, eFax.com, http://www.efax.com/products/corporate/corp_faq.html, (Oct. 15, 2000), pp. 1–3.

*How to forward a fax to a fax machine*, eFax.com, http://www.efax.com/help/wireless/WLSforward_fax.html, (Oct. 15, 2000), 1 page.

*How to forward a fax to to an email address*, eFax.com, http://www.efax.com/help/wireless/WLSforward_email.html, (Oct. 15, 2000), 1 page.

*jConncet Premier*, eFax.com, http://www.j2.com/services/services.asp, (Oct. 15, 2000), 1 page.

RightFax by AVT, *Reducing High–volume Document Delivery Costs and Speeding Communication with Suppliers, Business Partners and Customers*, 7 pages, (2000), AVT Corp.

RightFax by AVT, *How Businesses Can Leverage Combined Technologies for Speed and Efficiency*, 21 pages, (date unknown), AVT Corp., Kirkland, Washington.

* cited by examiner

*Control Form Settings Window*

900

COMPAQ   U *Control Form*

910 — ☐ FAX    ☐ COPY    ▶☐ SCAN    | | | | | |

CONTRAST SETTING
920 — Lighter   ☐   ☐   ▶☐   ☐   ☐   Darker

FAX SETTINGS

FROM:

TO:

930

COVER PAGE
☐ Yes

NOTE:

RESOLUTION
▶☐ Standard
☐ Fine

COPY/SCAN TYPE
940 — ▶☐ Black Draft   ☐ Black Normal   ☐ Black Photo   ☐ Color Draft   ☐ Color Normal   ☐ Color Best

COPY SETTINGS
950 — SIZE   QUANTITY
▶☐ 100%   ▶☐ 1   ☐ 2   ☐ 3
☐ 93% Fit Letter to A4   ☐ 4   ☐ 5   ☐ 6
☐ 90% A4 to Letter   ☐ 7   ☐ 8   ☐ 9
☐ 80% Legal to A4   COLLATE
☐ 75% Legal to Letter   ▶☐ Yes   ☐ No

SCAN SETTINGS — 960
FILE FORMAT   DIRECTORY
▶☐ BMP   ▶☐ User Directory
☐ JPG
☐ TIFF

*A Printed Control Form*

FIG. 9

1410   IF CURRENT TIME/DATE < START TIME/DATE AND
START TIME/DATE < STOP TIME/DATE
THEN FAX FORWARDING STATE IS SET TO FUTURE

1420   IF CURRENT TIME/DATE > = START TIME/DATE
AND START TIME/DATE < STOP TIME/DATE
THEN FAX FORWARDING STATE IS SET TO ON

1430   IF CURRENT TIME/DATE > = START TIME/DATE
AND START TIME/DATE > =STOP TIME/DATE
THEN FAX FORWARDING STATE IS SET TO OFF

METHOD AND APPARATUS FOR REMOTE FAX FORWARDING CONTROL

BACKGROUND OF THE INVENTION

1. Field of the Invention

The present invention generally relates to fax forwarding and more particularly to a method and apparatus for remote fax forwarding control.

2. Description of the Related Art

Despite the prevalence of the Internet and e-mail, fax transmission has remained a dominant method of business communication. While fax technology is relatively inexpensive and widely available, a user often needs access to information when on the road or away from the office or home where his facsimile machine is located. In an effort to address this concern, certain standalone facsimile machines have provided a capability to forward faxes to a dedicated phone number of another facsimile machine. This capability is generally termed "fax forwarding."

The ease of use and functionality of fax forwarding by facsimile machines has been fairly limited. One limitation is that it has been necessary to activate or deactivate fax forwarding at the particular facsimile machine. Therefore, if a user leaves the location of the facsimile machine and forgets to activate fax forwarding, then the user lacks an ability to activate fax forwarding when it is most needed. A further limitation is that a facsimile machine may only forward a fax to another facsimile machine. In other words, there is no provision in a facsimile machine for directly forwarding a fax to an email account. As a result, it is very difficult (if at all possible) for a user to gain access to a fax while away from the location of the facsimile machine.

In addition to facsimile machines, there are fax-to-email and email-to-fax services that provide fax forwarding. This type of service generally involves sending a fax to a local or long distance number and automatically forwarding the fax to an email account. Similarly, there are fax server solutions that enable faxes to be transmitted and received like e-mail messages. An email-to-fax service or fax server, though, does not allow for faxing a physical document. Therefore, a user cannot sign a physical document and then fax the signed document through either an email-to-fax service or a fax server solution.

SUMMARY OF THE INVENTION

Briefly, a facsimile machine provides firmware to remotely activate and deactivate fax forwarding. The firmware enables a user to remotely activate or deactivate fax forwarding through an email, a fax, or a telephone. The facsimile machine may be set by the user to activate and deactivate fax forwarding at a predetermined activation time and a predetermined deactivation time. If fax forwarding with local printing is activated, the facsimile machine locally prints a fax after the fax is forwarded. The facsimile machine may be a multifunctional peripheral.

BRIEF DESCRIPTION OF THE DRAWINGS

A better understanding of the present invention can be obtained when the following detailed description of the preferred embodiment is considered in conjunction with the following drawings, in which:

FIG. 1b is a block diagram of an embodiment of the personal computer according to FIG. 1a;

FIG. 9 is a picture of a printed control form used for controlling the exemplary facsimile machine of FIG. 2;

FIG. 10 is a block diagram showing four disclosed techniques for controlling the remote forwarding of the exemplary facsimile machine of FIG. 1a;

FIGS. 11A and 11B provide a flow chart of an exemplary remote fax forwarding technique for the exemplary facsimile machine of FIG. 1a;

DETAILED DESCRIPTION OF PREFERRED EMBODIMENT

The following relate patent applications are hereby incorporated by reference as if set forth in their entirety:

U.S. patent application Ser. No. 09/253,192, entitled METHOD AND APPARATUS FOR CONTROLLING A SCANNING DEVICE, filed Feb. 19, 1999;

U.S. patent application Ser. No. 09/253,209, entitled SELECTIVE DOCUMENT SCANNING METHOD AND APPARATUS, filed Feb. 19, 1999.

The Facsimile Machine F

Figure 1A:
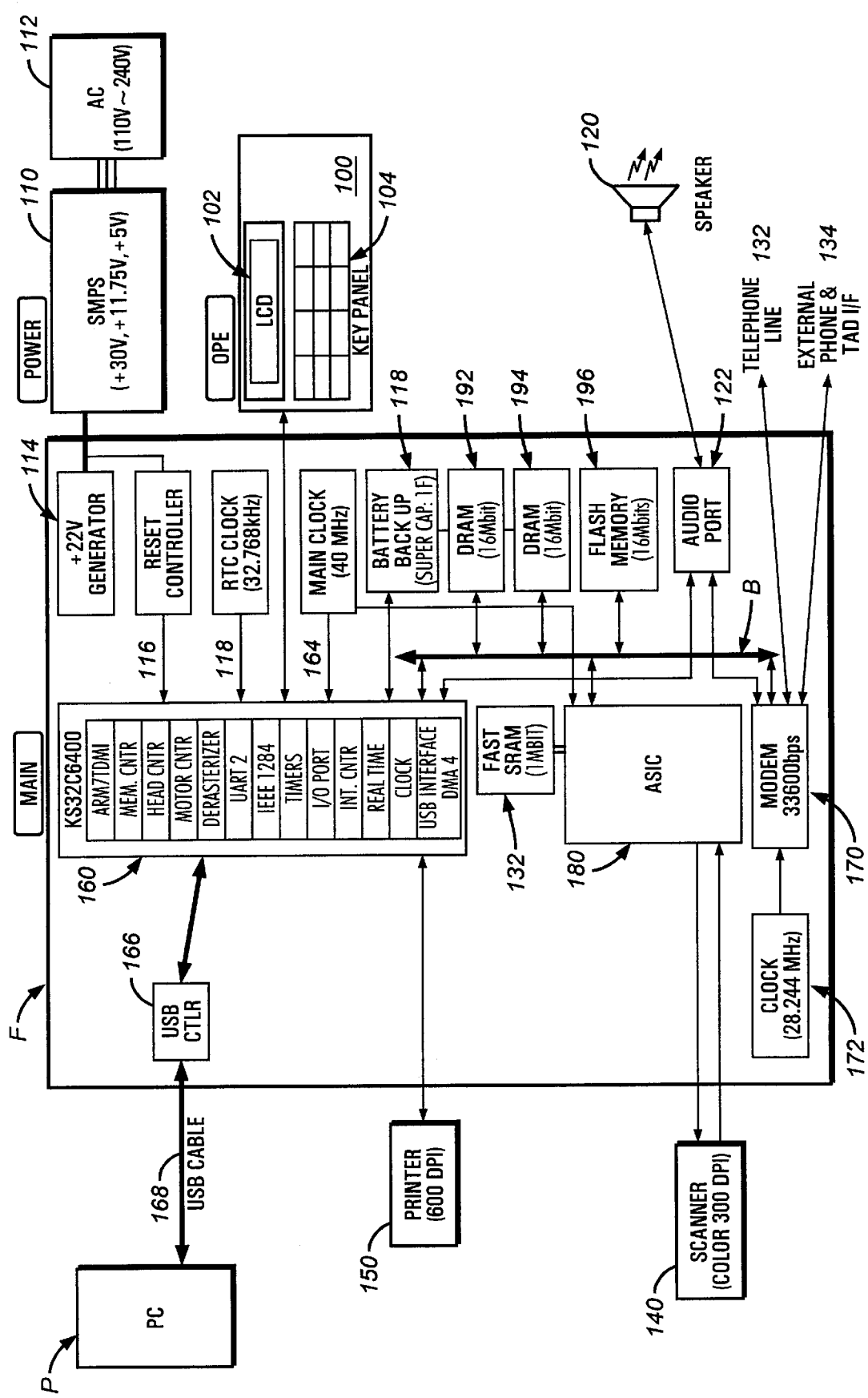
FIG. 1a is a block diagram of an exemplary facsimile machine connected to a personal computer according to a disclosed embodiment.

Turning now to the drawings, FIG. 1a is a block diagram of an exemplary facsimile machine F according to a disclosed embodiment. Although the facsimile machine F is shown connected to a personal computer P, the facsimile machine F can be operated in a standalone environment. When connected to the personal computer P, software installed on the personal computer P can be used to control the operation of the facsimile machine F. Further, when connected to the personal computer P, specially-formatted email messages can be used to control the facsimile machine F. Regardless of whether the facsimile machine F is connected to the personal computer P, the facsimile machine F can be controlled by use of a control panel 100 on the facsimile machine F, by using a specially-designed control form, or via a telephone.

Certain elements of the facsimile machine F have been omitted from FIG. 1*a* for clarity. In particular, elements related to the printer, scanner, and telephone interface have been omitted for clarity purposes. As shown in FIG. 1*a*, the facsimile machine F is configured as a multifunctional peripheral (MFP). An MFP provides the functionality of a scanner, copier, printer, and a facsimile machine in a single device. The Compaq A1500 All-In-One is one embodiment of a MFP similar to the facsimile machine F shown in FIG. 1*a*.

A control panel 100 allows direct control over the functions of the facsimile machine F. An LCD display panel 102 displays messages produced by the facsimile machine F and also shows data entered at a key panel 104. A power supply 110 connected to an AC transformer 112 provides electrical power for the facsimile machine F. A +22 volt generator 114 and reset controller 116 couple the power supply 110 to a microcontroller 160. An audio part or controller 122 provides audio signals to a speaker 120 for audible alarms and other audible signals. A telephone jack 132 allows for the connection of a telephone line for facsimile transmission. A second telephone jack 134 provides a connection for an external telephone and/or telephone answering device. A color 300 dot per inch scanner 140 and a color 600 dot per inch printer 150 are integrated into the facsimile machine F.

In one embodiment, the printer 150 is a Lexmark color printer. Other printer mechanisms can be used. In another embodiment, the microcontroller 160 is a KS32C6400 microcontroller from Samsung Corporation. Other microcontrollers can be used. The microcontroller 160 provides control functions for the facsimile machine F, including a derasterizer, timers, I/O ports, interrupt controllers, clocks, and a Universal Serial Bus interface. Other control functions can be provided by the microcontroller 160. A real-time clock 162 and main clock 164 provide clocking for the microcontroller 160. A SB controller 166 allows for connecting the facsimile machine F to the personal computer P using a USB cable 168. Though shown externally to the facsimile machine F, it should be understood that the printer 150, scanner 140, and certain other circuitry may be integrated into the facsimile machine F.

A fax and/or data modem 170 and a clock 172 connect the telephone line interface 130 to the microcontroller 150 via a bus B. The modem 170 can be used to connect to an Internet Service Provider (ISP) for connection to the Internet or other networks. In one embodiment, network interface circuitry such as an Ethernet controller can be used to connect the facsimile machine F to a network. A controller 180 provides control functions for the scanner 140 and is also connected to the bus B. A fast static random access memory (SRAM) 182 provides memory to the controller 180. In one embodiment, he controller 180 is an application specific integrated circuit from Samsung Corp ration designed for image processing. Other controllers can be used. Also connected to the bus B are a flash memory 196 for storing firmware for the facsimile machine F, and two dynamic random access memories (DRAM) 192 and 194 for storing of image data. The flash memory 196 also stores printer and scanner driver firmware. This particular facsimile machine F is illustrative only as a wide variety of facsimile machines may be used.

Figure 1B:
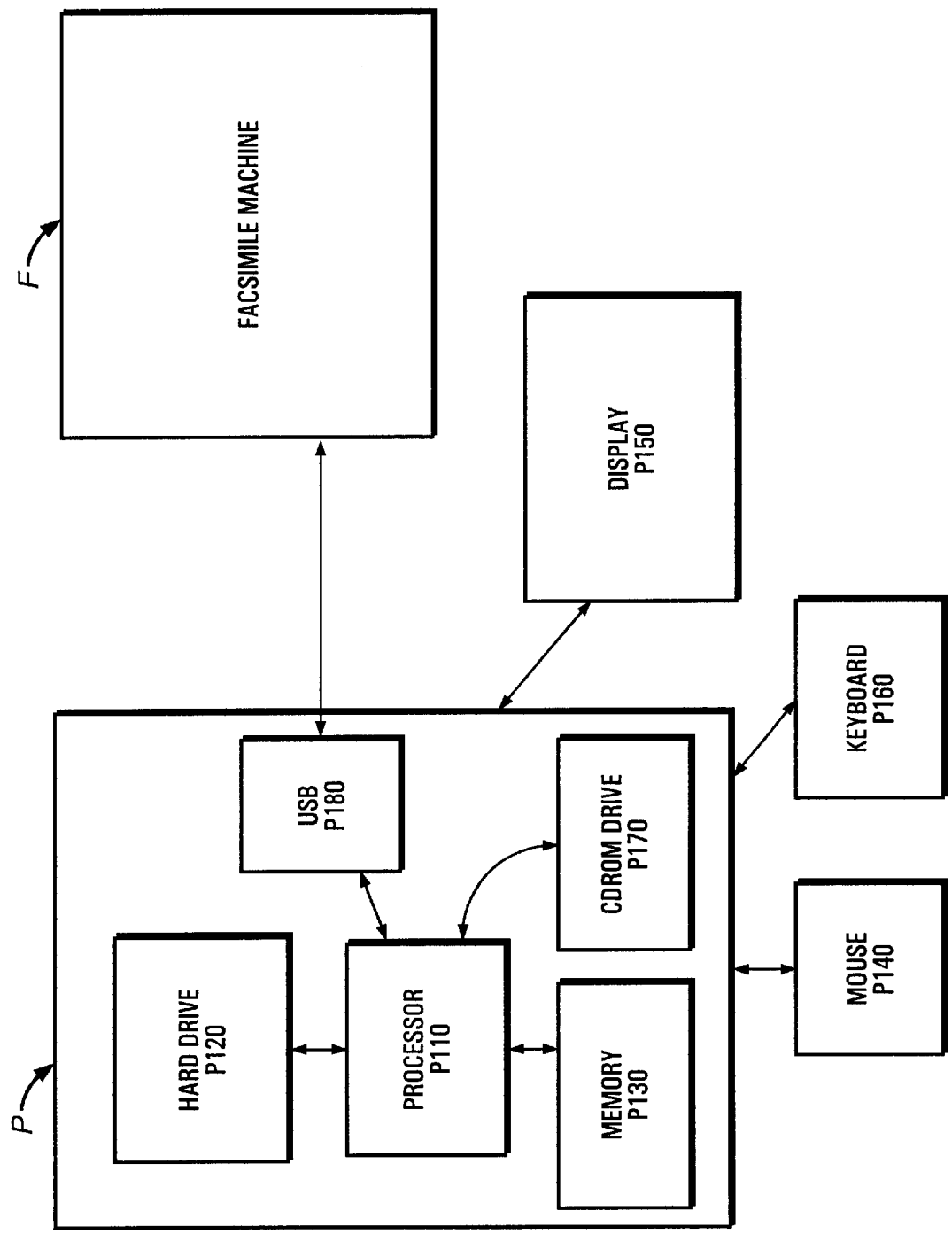

Turning to FIG. 1*b*, the personal computer P of FIG. 1*a* is shown connected to the facsimile machine F of FIG. 1*a*. The personal computer P is a conventional personal computer, with a processor P110, a hard drive P120 connected to the processor P110, and a memory P130 connected to the processor P110. Also connected to the personal computer P are a mouse P140, a display P150, and a keyboard P160. The hard drive P120 provides storage for an operating system for the personal computer P and utility software for controlling the facsimile machine F. A CDROM drive P170 provides the ability to receive and install the facsimile machine control software on a CDROM distribution medium. The keyboard P160, the mouse P14, and the display P150 can be used by a user of the personal computer P to control the operation of the facsimile machine F.

Figure 2:
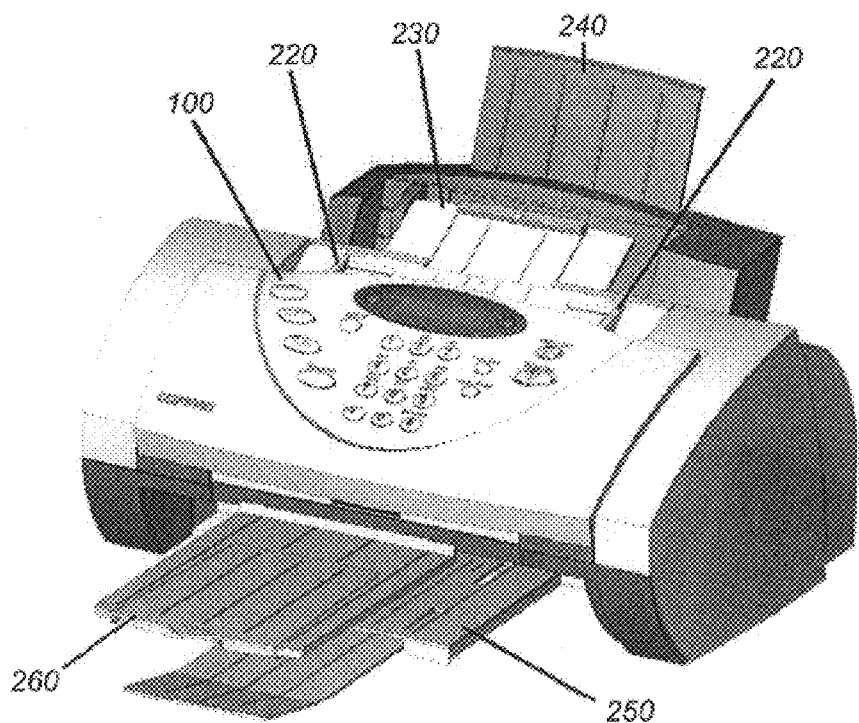
FIG. 2 is a picture of a front view of an exemplary facsimile machine according to a disclosed embodiment.

FIG. 2 is a picture of a front view of an exemplary facsimile machine F according to a disclosed embodiment. Several features of the facsimile machine F are visible in the front view. The Control Panel 100 accesses the functions of the facsimile machine F. Two Document Input Guides 220 align an original document for faxing, copying, or scanning. A Document Input Tray 230 supports documents for faxing, copying, or scanning. A Paper Input Tray Extension 240 supports paper. A Paper Exit Tray 250 holds printed pages. Finally, a Document Exit Tray 260 holds original documents that have been fed through the scanner section of the facsimile machine F.

Figure 3:
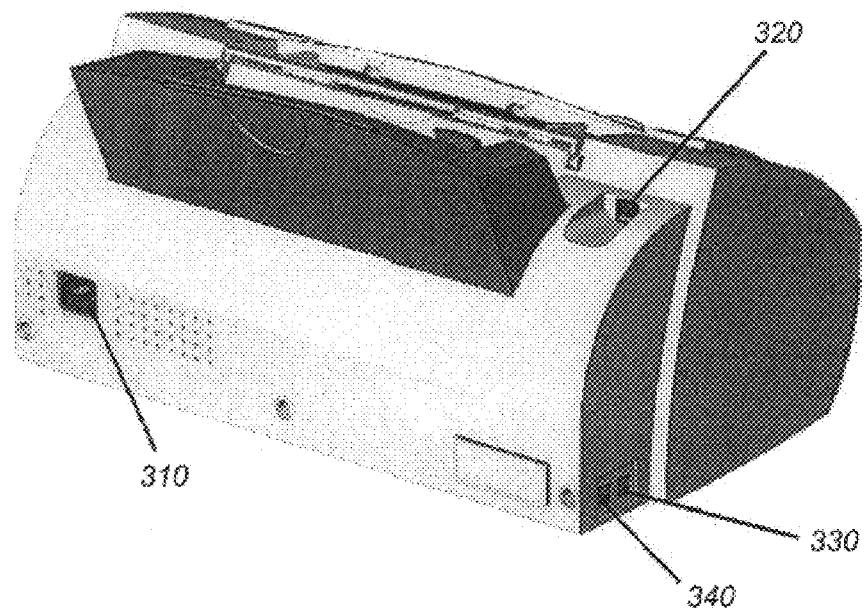
FIG. 3 is a picture of a rear view of the exemplary facsimile machine of FIG. 2.

In a rear view of the facsimile machine F, FIG. 3 shows an AC power cord connector 310, a USB port 320, an Extension (EXT) Line to telephone or answering machine jack 330, and a Telephone (LINE) to wall jack 340.

Figure 4:
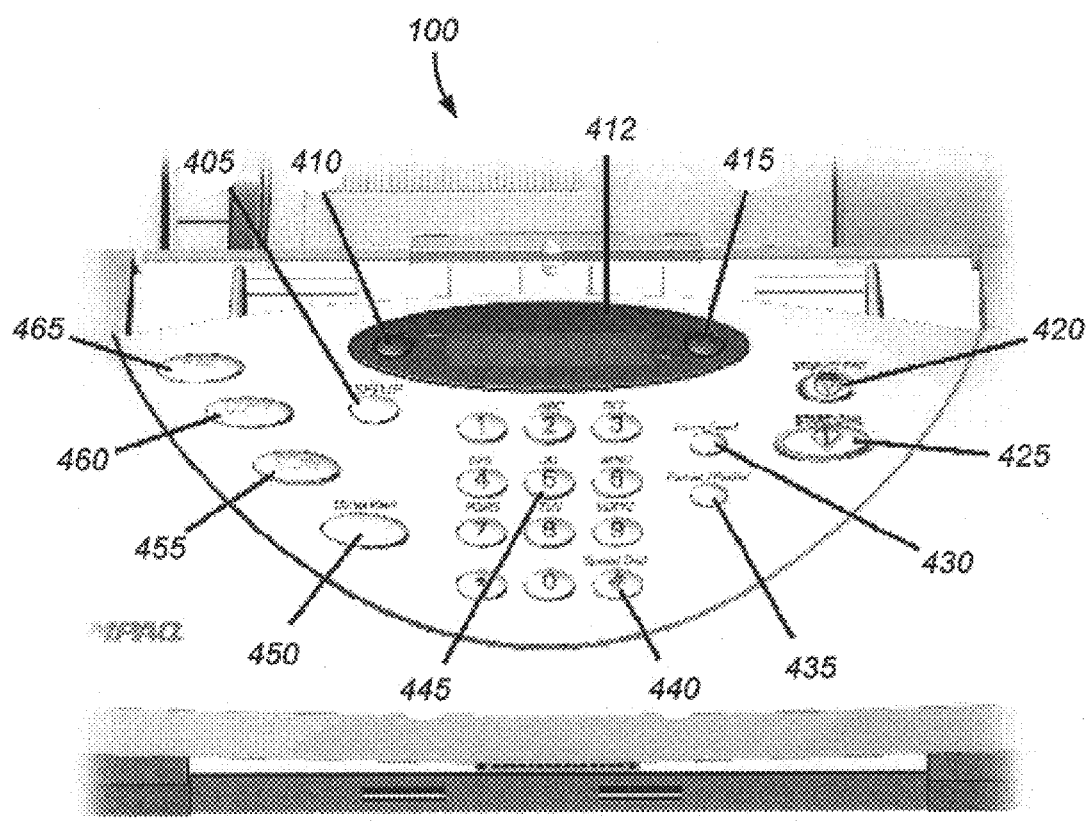
FIG. 4 is a picture of a control panel of the exemplary facsimile machine of FIG. 2.

A more detailed view of the control panel 100 of FIG. 2 is shown in FIG. 4. In one embodiment, the control panel is located on the front of facsimile machine F; however, other locations for the control panel 100 are possible. As shown in FIG. 4, the control panel 100 contains a collection of buttons that allows an operator of the facsimile machine F to control its functions. A Setup button 405 provides menus to access system setup, cartridge maintenance, and print report features of the facsimile machine F. A Menu button 410 displays features for each operation. An Options button 415 changes the settings for a feature displayed in a display 412 when the Options button 415 is pressed after the Menu button 410. A Stop/Clear button 420 halts an action or clears an incorrect value. A Start/Dial button 425 begins a selected action, such as faxing. Pressing this button first allows On Hook Dialing (OHD). When multiple jobs are running, the Option button 415 can be used to select a job. Pressing the Stop button 420 stops the job. Pressing the Start button 425 lets the job continue. A Form Feed button 430 is used to continue printing after reloading the paper tray 240 when it runs out of paper during a print job. The Form Feed button 430 also removes paper if paper does not exit completely after printing.

A Pause/Redial button 135 adds a three-second pause when dialing or dials the last number called. A #/Speed Dial button 440 enters the "#" symbol when dialing. If pressed when the facsimile machine F is in an idle state, this button 440 provides access to a Speed Send menu for pre-defined speed-dialing numbers (Send to Fax or Email.). A set of Keypad buttons 445 ("0" . . . "9") is used to dial a number or select a value for printing copies. A Control Form button 450 prints out a Control Form or starts a task using a Control Form. Use of a Control Form is described below in connection with FIGS. 7 and 9. A Scan button 455 creates electronic files on the user's host computer from hardcopy documents when connected to a host computer. A Copy button 460 copies a document. Finally, a Fax button 465 is used to fax a document. The content, types, and arrangement of buttons on the control panel 100 are exemplary and illustrative only and other buttons and arrangements of buttons can be used.

Controlling The Facsimile Machine F From The Personal Computer P

Figure 5:
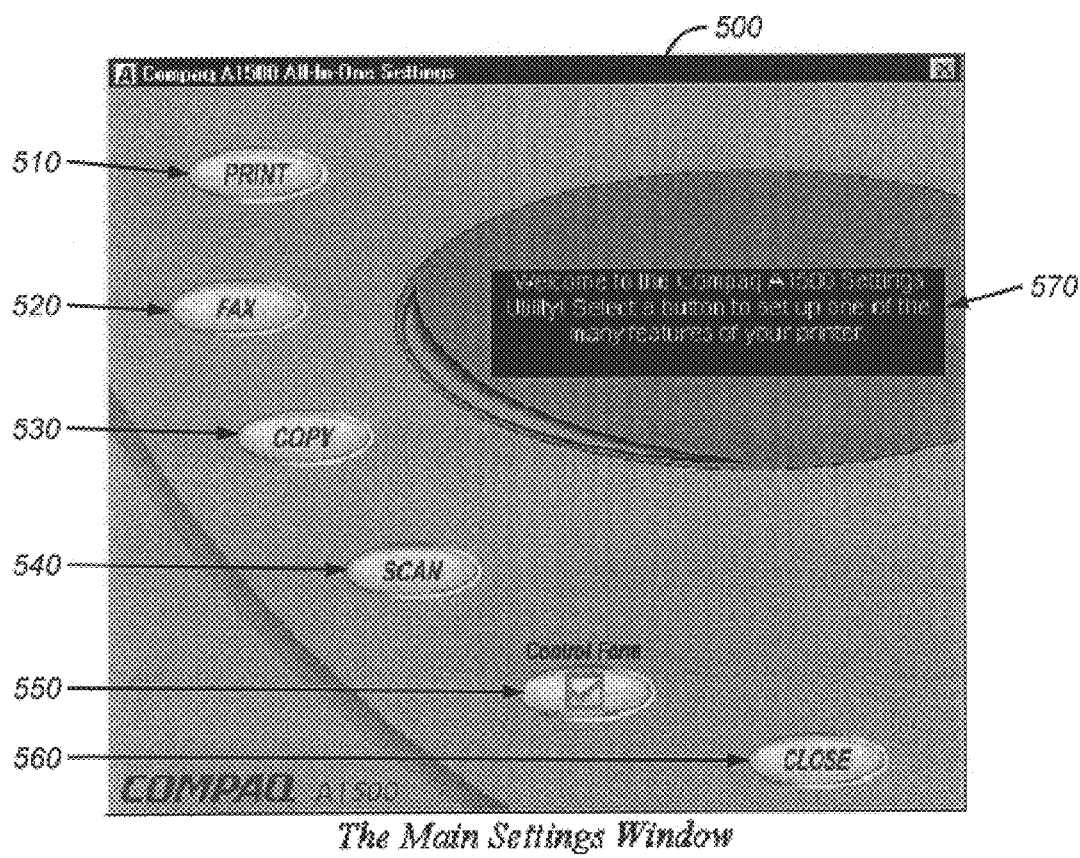
FIG. 5 is a facsimile settings utility on a personal computer connected to the exemplary facsimile machine of FIG. 2.

FIG. 5 is a picture o a main settings window 500 in a utility software used to control the facsimile machine F from the personal computer P. The main settings window 500 is the starting point for accessing all of the facsimile machine F's settings. Selecting one of the buttons allows for changing the default settings of the corresponding feature (Fax for Fax settings, Copy for Copy settings, etc.). Changes to the settings can be made even when facsimile machine F is not connected to the personal computer F. Any changes can be sent to the facsimile machine F the next time it is connected to the personal computer P. In one embodiment, settings changes are sent to the facsimile machine F after one of the Ok button, the Close button, or the [x] close button is pressed. The Print button 510, Fax button 520, Copy button 530, Scan button 540, and Control Form button 550 provide access to the Print, Fax, Copy, Scan, and Control Form setting, respectively. The content, type, and arrangement of elements as shown in FIG. 5 are exemplary and illustrative, and other buttons and arrangements of buttons can be used.

Figure 6:
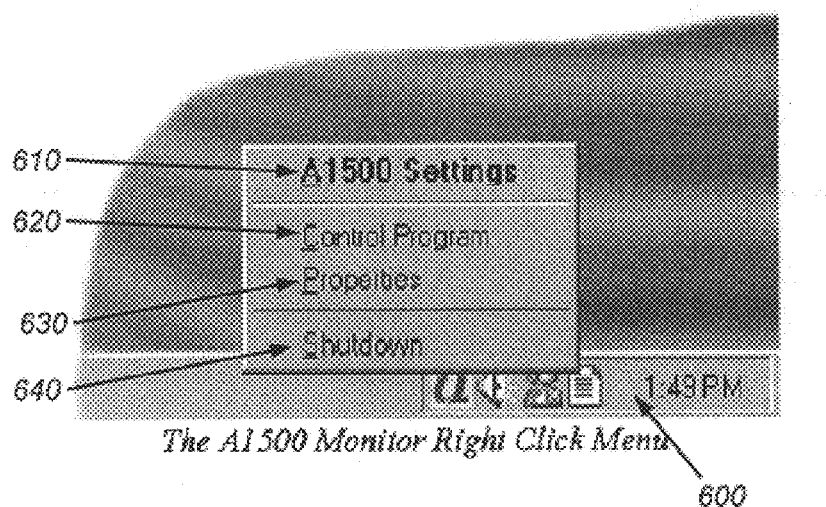
FIG. 6 is a picture of a portion of a personal computer desktop showing a monitor utility for the exemplary facsimile machine of FIG. 2.

As shown in FIG. 6, the main settings window 500 can be accessed by right clicking with a mouse on a facsimile machine icon in the system tray 600. A right client menu will pop up. Clicking on the "Settings" element 610 of the menu causes the main settings window 500 of FIG. 5 to appear. A control element 620, properties element 630, and shutdown element 640 allow control over other aspects of the utility software.

Figure 7:
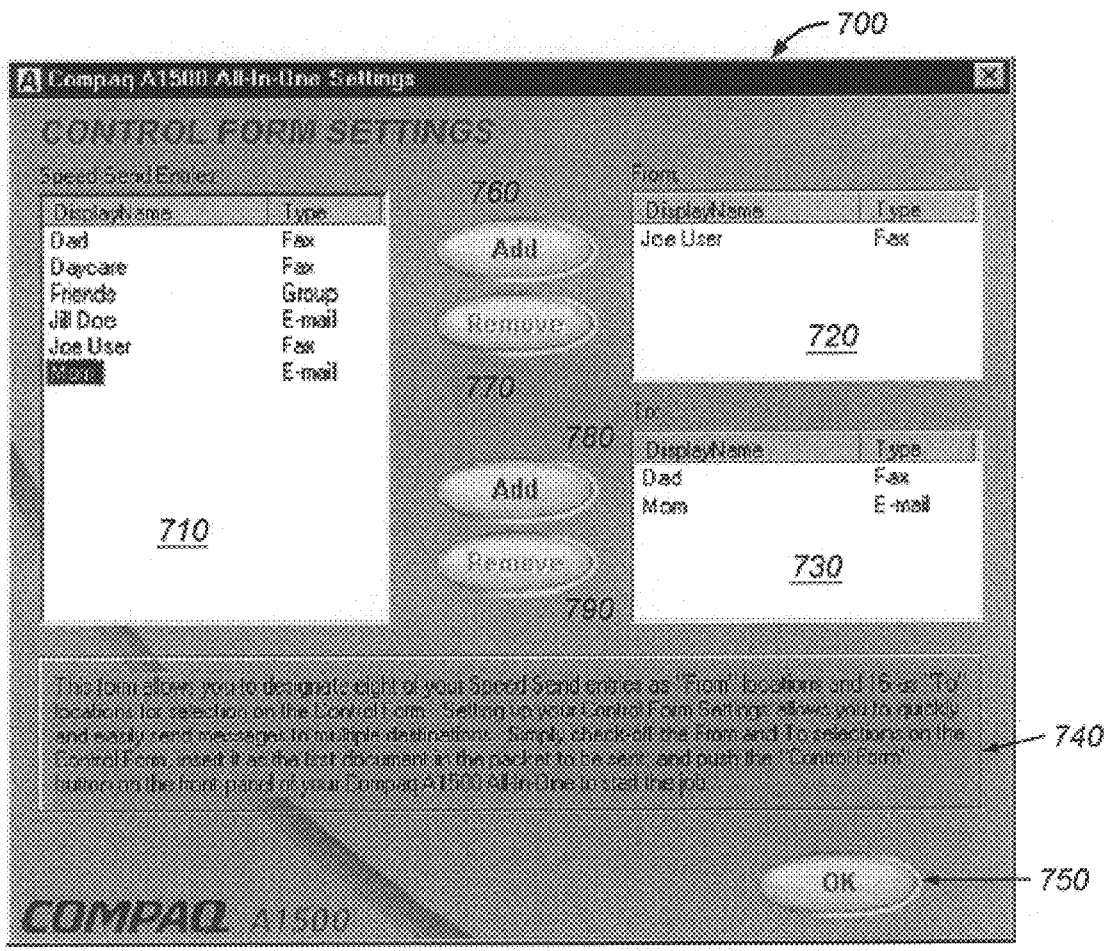
FIG. 7 is a picture of a personal computer utility for setting fields in a control form used to control exemplary facsimile machine of FIG. 2.

Pressing the Control Form button 550 on the main settings window 500 of FIG. 5 displays the Control Form Settings window 700 as shown in FIG. 7. As described in more detail below, Control Forms are specially formatted forms which are interpreted by the facsimile machine F, allowing for giving instructions to the facsimile machine F by marking a paper form. The Control Form may generally contain machine or human readable indicia. As usedherein, indicia generally relates to any marking or contrasting character or region that is detectable by the facsimile machine F. The Control Form Settings window 700 allows for selecting Speed Send entries for Control Form Fax From and Fax To boxes or sections 720 and 730. The From and To entries will appear on the Control Form when it is printed. A checkbox will appear next to each name . To send a fax with the Control Form, the user can simply check the boxes. Control Forms are described in more detail below. A Speed Send Entries box 710 lists all of the Speed Send entries currently have been defined to the facsimile machine F. The speed send list should be set up before entries can be added to the Control Form. Speed Send entries allow for quickly sending faxes to one or more predefined destinations. A Control Form supports up to eight (8) Fax From entries. A From box 720 displays the speed send entries currently in the Fax From list. A Control Form also supports up to sixteen (16) Fax To entries. A To box 730 displays the speed send entries currently in the Fax To list. To add a Speed Send entry to the From or To lists, the entry to be added is selected by clicking on the name in the Speed Send Entries box 710. Then the Add button 760 or 780 next to the list to which the entry is to be added is selected. To remove a From or To entry, the name to be removed is selected by clicking on it. Then Remove button 770 or 790 is selected. Once the From and To lists have been defined, the settings window can be closed to save the entries. A Control Form can be printed by pressing the Control Form button 450 on the front control panel of the facsimile machine F as shown in FIG. 4. In one embodiment, the scanner input tray should be empty before printing a Control Form. The content, type, and arrangement of fields as shown in FIG. 7 are exemplary and illustrative, and other fields and arrangements of fields can be used.

Figure 8:
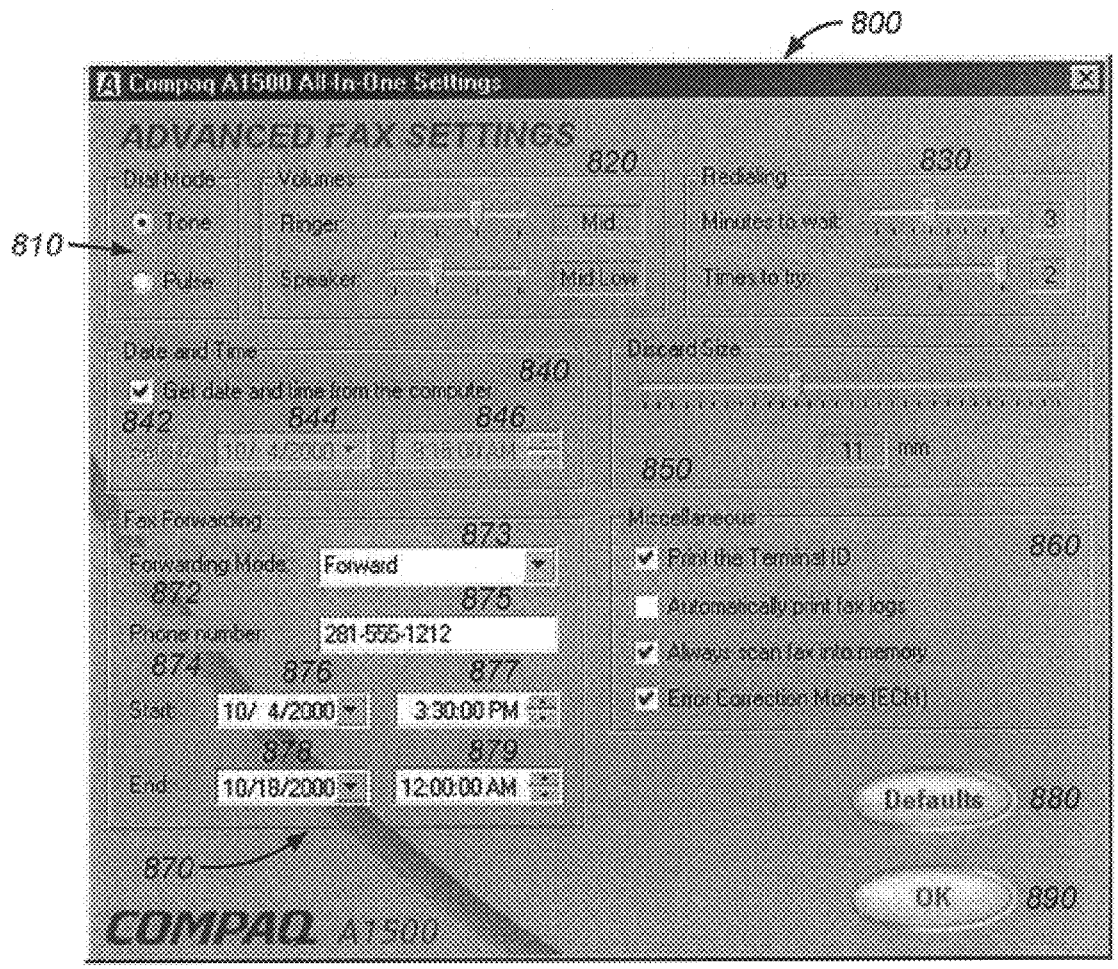
FIG. 8 is a picture of a personal computer utility for controlling facsimile forwarding of the exemplary facsimile machine of FIG. 2.

Turning to FIG. 8, an Advanced Fax Settings window 800 is shown, which is accessed by selecting the Fax button 520, then selecting Advanced Settings on the resultant window (not shown). The Advanced Fax Settings page contains fax settings that are infrequently used or changed, as well as facsimile forwarding settings. The Dial Mode area 810, the Volumes area 820, the Redialing area 830, the Date and Time area 840, and the Discard Size area 850 are conventional facsimile machine settings and will not be described below in detail. The conventional facsimile machine fields shown in FIG. 8 are exemplary and illustrative only, and additional fields and arrangements of fields can be used.

To have the facsimile machine F forward faxes, the Forwarding mode 872 should be set to Forward. To forward faxes and print a local copy as well, the Forward and Print mode should be selected. The destination fax number to which the faxes should be forwarded is specified in field 874. Further, a starting and ending date and time during which fax forwarding will be active is set using the Start boxes 876–877 and End boxes 878–879. To disable Fax Forwarding before the end date and time, the Forwarding Mode 872 can be set to Disabled. To reset all of the advanced fax settings to their default values, the Defaults button 880 can be pressed. Otherwise, pressing the OK button 890 accepts the changes. The utility software will then communicate to the facsimile machine F over the USB cable 168 to update the settings in the facsimile machine F. The content, type, and arrangement of fields as shown in FIG. 8 are exemplary and illustrative, and other fields and arrangements of fields can be used.

Control Forms

FIG. 9 shows an exemplary facsimile Control Form 900 for use in controlling the facsimile machine F. The Control Form has six areas for controlling different aspects of the facsimile machine F. Area 910 can be used to select the type of action to be performed by the facsimile machine F by selecting Fax, Copy, or Scan. Area 920 allows control over contrast. Area 930 indicates facsimile settings to be used by the facsimile machine F, such as the destination list for the facsimile to be sent. Area 940 selects the type of copying to be performed. Area 950 sets options for copy actions and area 960 sets scanning settings. In one embodiment, additional fields are added the Control Form to specify the forwarding mode, phone number, and start/end times, as specified in the Advanced Facsimile Settings of FIG. 8. The contents of the various area 3 or boxes on the Control Form can be preset or customized by the user. The arrangement and content of the Control Form as shown are exemplary and illustrative, and other fields and arrangements of fields can be used.

Controlling The Facsimile Machine F Remotely

Figure 10:
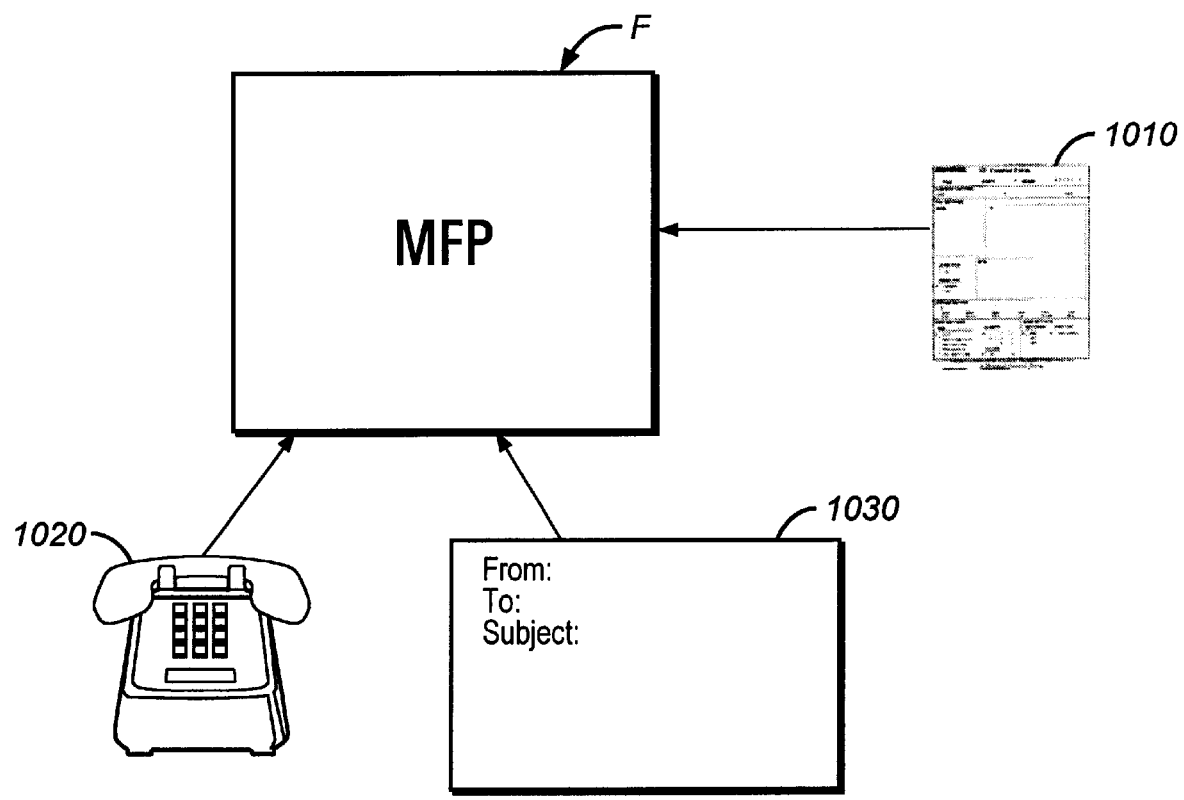

FIG. 10 indicates three different exemplary techniques which can be used to control the fax forwarding capabilities of the facsimile machine F remote from the facsimile machine F. These techniques of remote control allow the user to change the state of the facsimile machine while away from the facsimile machine F, even if the facsimile machine F is not connected to the personal computer P.

First, an ordinary telephone can be used, controlling the facsimile forward settings by using tones generated by a user pressing buttons on a tone-based telephone. Users can dial their facsimile number and when the facsimile machine F answers, enter a series of numeric codes that correspond to different settings and features on the facsimile machine F. In one embodiment, instead of using numeric codes on a tone-based telephone, voice recognition techniques can be used to allow the user to verbally control the facsimile forwarding settings.

Second, the facsimile machine F can monitor incoming email traffic. A user can communicate with the facsimile forwarding features of the facsimile machine F by sending an email message with a predetermined set of keywords in the subject and message body which give full control of the facsimile forwarding modes and settings. The message would be deciphered by the facsimile machine F and the appropriate settings would be updated and commands executed on the facsimile machine F.

Third, control forms a shown in FIG. 9 can be faxed to the facsimile machine F. Upon receipt of th control form, the facsimile machine F recognizes and decodes the Control Form, allowing control over the facsimile forwarding settings. In one embodiment, handwriting recognition capability in the facsimile machine F allows recognizing handwritten instructions to change facsimile forwarding settings, overcoming the need to use a pre-printed control form to remotely alter the state of the facsimile machine F.

Other techniques for remotely controlling facsimile forwarding can be used. In one embodiment, the facsimile machine F can monitor an electronic calendar for the user and intelligently switch into or out of facsimile forwarding mode whenever the calendar indicates the user will be out of the office. Likewise, when the calendar indicates that the user is scheduled to return to the office, the facsimile forwarding feature can be automatically disabled. As another example, a fax may be forwarded to a secure web page or website or to a web-enabled collaborative environment for web-based fax retrieval. In a further embodiment, the facsimile machine F can be connected to a network using any network connection technique, including both wired and wireless techniques. In the network-connected embodiment, the facsimile machine F can receive and sent faxes and be remotely controlled through the network connection using email or other techniques for transport of the fax and remote control data.

In a further embodiment, fax forwarding can be enabled on demand. That is, the facsimile machine F can s ore incoming faxes internally or externally in a form accessible to the facsimile machine F, then the user can remotely interrogate the facsimile machine F for information about the stored faxes and select a specific fax or set of faxes to be forwarded, based on certain conditions such as the period of time received, a particular originating number, or other similar conditions.

Figure 11A:
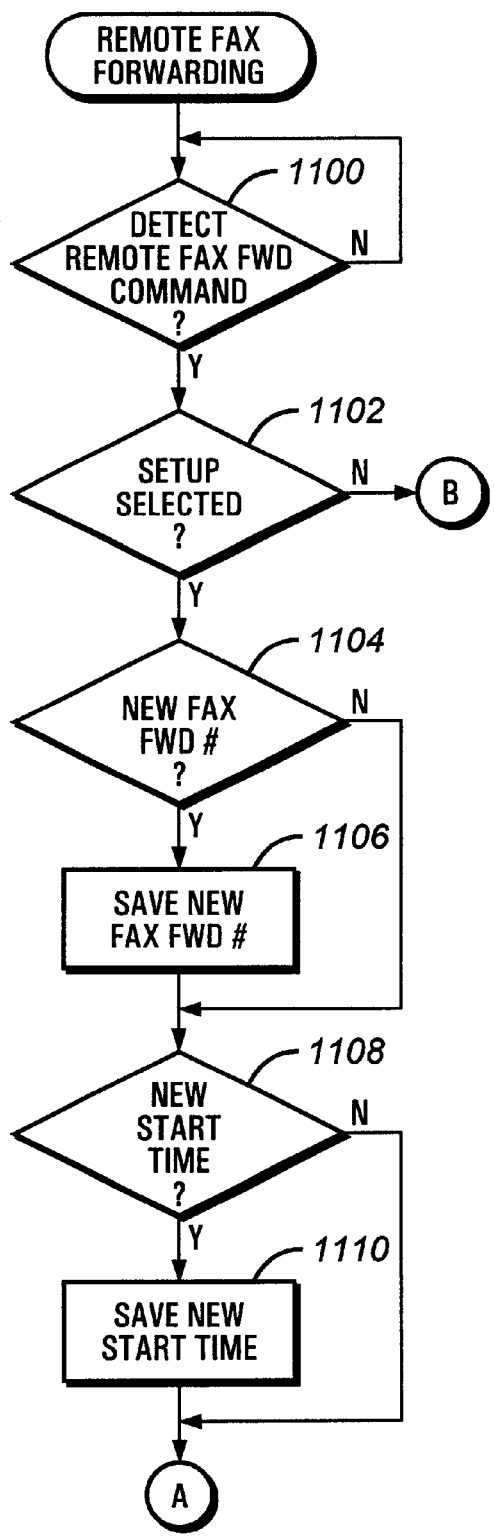
Figure 11B:
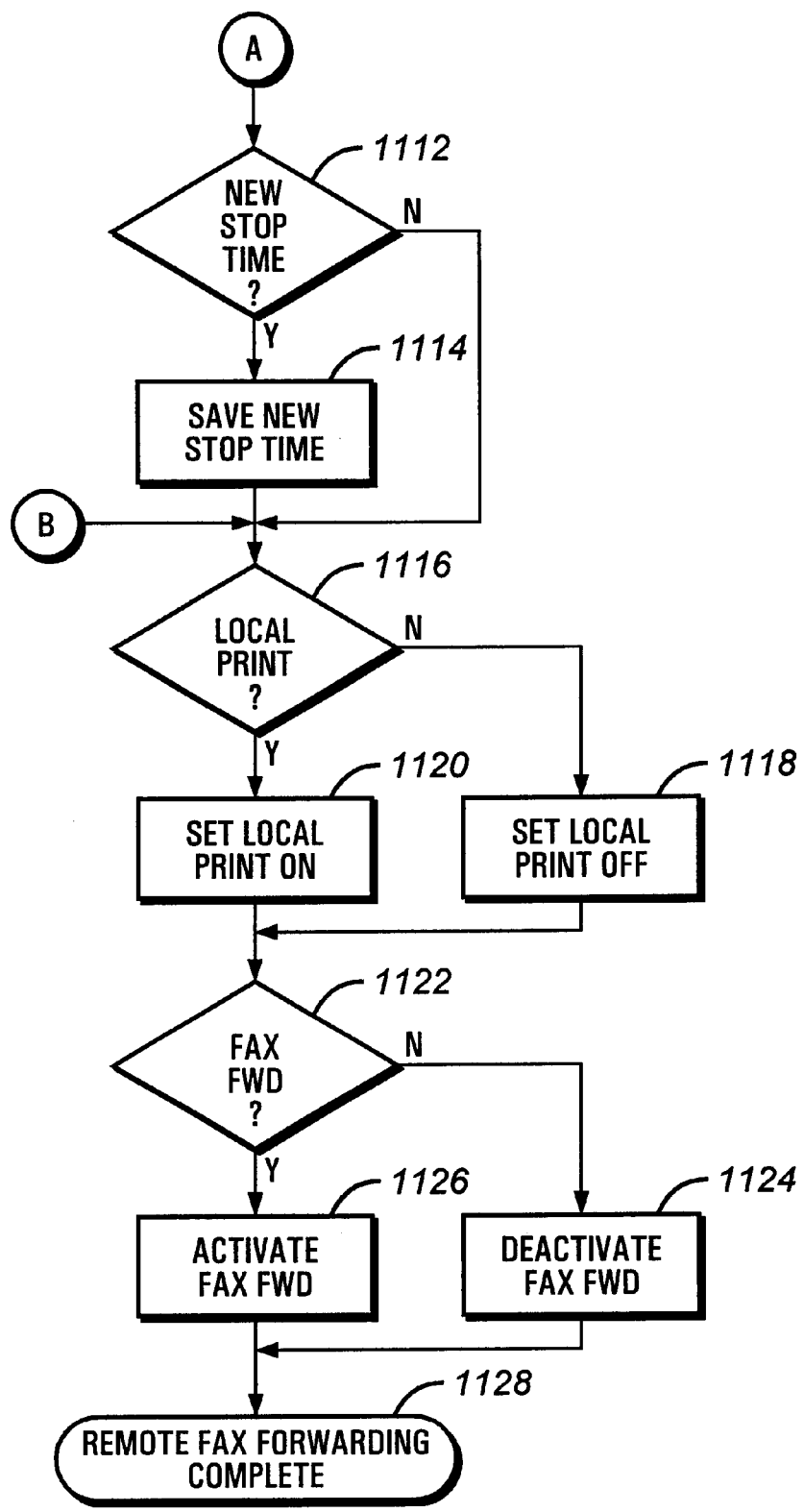

Referring to FIGS. 11A and 11B, an exemplary remote fax forwarding technique is shown. Beginning in step 1100, it is determined whether a remote fax forward command is detected. The remote fax forward command may be provided such as in the manners described above in connection with FIG. 10. If a remote fax forward command is not detected in step 1100, then control remains in step 1100. If a remote fax forward command is detected, then control proceeds to step 1102 where it is determined whether fax forwarding setup is selected. If fax forwarding setup is selected, the control proceeds to step 1104. Steps 1104 through 1114 relate to fax forward setup. In step 1104, it is determined whether a new fax forward number is selected. If so, control proceeds to step 1106 where the new fax forward number is saved. If desired, multiple fax forward numbers may be specified. If a new fax forward number is not desired then control proceeds from step 1104 to step 1108. In this way, a user has the option of using the previous fax forward number. In step 1108, it is determined whether a new start time for fax forwarding is desired. If a new start time is desired, then control proceeds to step 1110 where the new start time is saved. From step 1110, control passes to step 1112. Control also proceeds to step 1112 if a new start time is not selected in step 1108. Step 1112 determines if a new stop time is desired. If a new stop time is selected, then control proceeds to step 1114 where the new stop time is saved. This process may save a new stop time even if a new start time is not entered.

From step 1114, control proceeds to step 1116 where it is determined if local printing is desired. Control also arrives in step 1116 if a new stop time is not selected in step 1112. From step 1102, control proceeds directly to step 1116 if fax forwarding setup is not selected. In this way, a user may bypass fax forward setup altogether. If local printing is selected in step 1116, then control follows to step 1120 where local printing is set to an on state. When local printing is on, a fax is printed locally before, after or concurrent with forwarding the fax. If local printing is not selected in step 1116, then control proceeds to step 1118 where local printing is set to an off state. From both steps 1120 and 1118, control proceeds to step 1112. In an alternative embodiment, if a user does no select fax forwarding setup in step 1102, then steps 1116 through 1120 may be bypassed in addition to steps 1104 through 1114. In step 1122, the process detects a desired fax forwarding state. If an on or active state of fax forwarding is desired, then control proceeds to step 1126 where fax forwarding is activated. If an off or inactive state of fax forwarding is desired, then control proceeds to step 1124 where fax forwarding is deactivated. Remotely deactivating fax forwarding is optional as fax forwarding may be disabled in other ways. For example, when a user returns to his office or home, the user may deactivate fax forwarding using the control keys of the facsimile machine F or through MFP control software on the personal computer P. In one embodiment, the deactivation can be triggered automatically by touching one of the control keys. In another embodiment, the deactivation is performed y using the control keys to specifically deactivate fax forwarding as part of fax forwarding setup. As a further example, fax forwarding may be automatically deactivated when the current time for the facsimile machine F matches the stop time provided by the user during fax forward setup. As can be seen from steps 1122 through 1126, a user may remotely activate or deactivate fax forwarding. From both steps 1126 and 1124, control proceeds to step 1128 where the remote fax forwarding process is completed.

Controlling The Facsimile Machine F From The Control Panel

Using the control panel 400 of FIG. 4, a user of the facsimile machine F can control the facsimile forwarding feature. By pressing the Menu button 410, and selecting the Fax Forwarding option, the state of the fax forwarding feature can be controlled as in FIG. 12. Window 1210 shows the display 412 with the fax forwarding feature disabled. Window 1220 shows the display 412 with the fax forwarding feature enabled. Window 1230 shows the display 412 with the fax forwarding with local print feature enabled. These modes can be set by successively pressing the options button 415 until the desired mode appears in the display 412.

Figure 13:
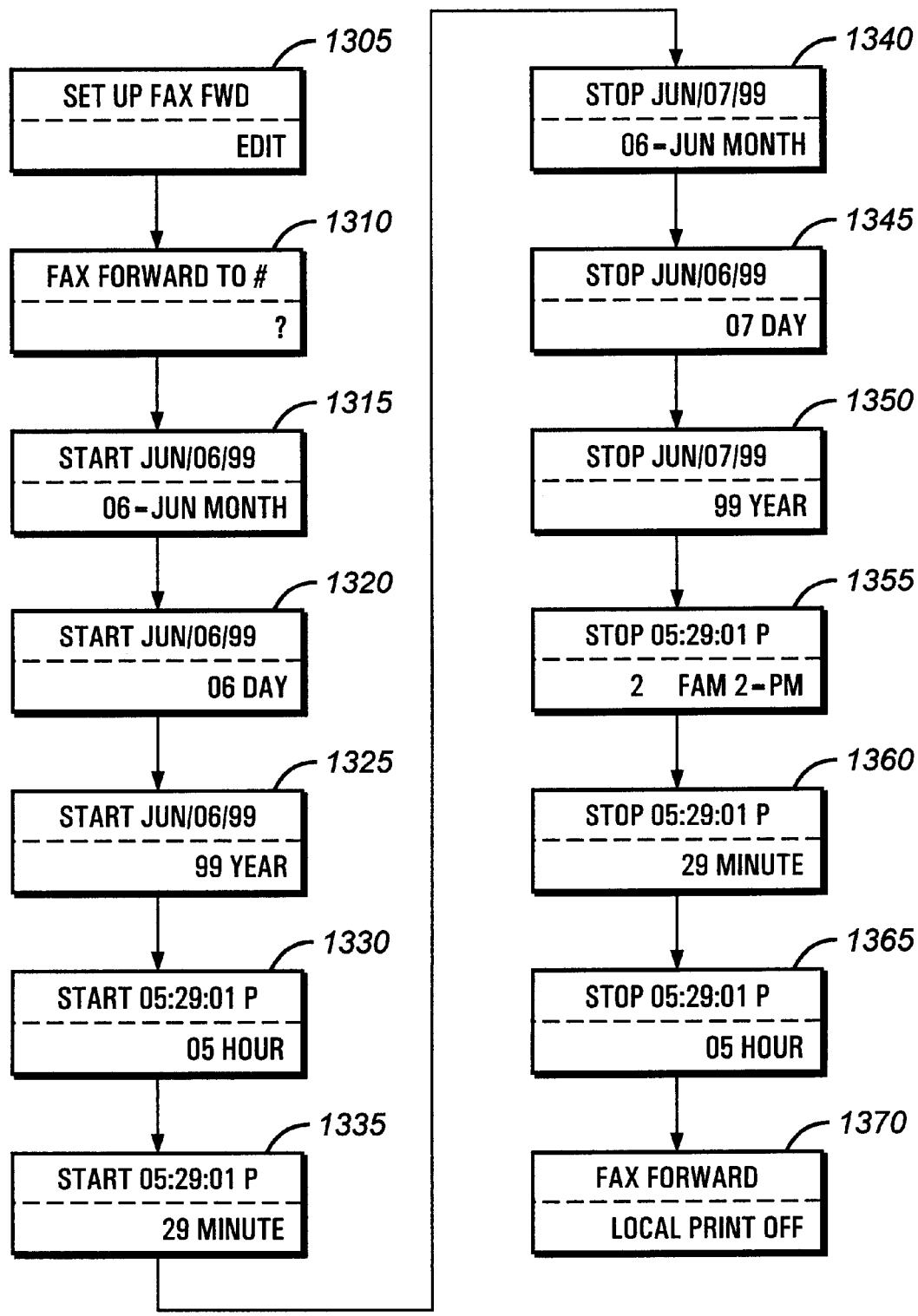
FIG. 13 is a series of pictures of the control panel of the exemplary facsimile machine of FIG. 2 showing setting the fax forwarding feature.

An exemplary series of windows for setting the fax forwarding feature is shown in FIG. 13. In window 1305, the display 1305 shows the "SETUP FAX FWD" menu. By cycling through the various elements of the menu, the EDIT entry is selected. Next, the display 412 shows window 1310, and allows the user to enter a fax forwarding destination number using the keypad 445. Windows 1315–1325 illustrate setting the month, day, and year for the start date for fax forwarding. Windows 1330–1335 illustrate setting the start time. As shown in FIG. 13, faxes will be forwarded to the chosen destination number beginning at 5:29:01 PM on Jun. 6, 1999. Likewise, windows 1340–1365 show setting a stop date and time, including setting AM or PM. As indicated by FIG. 13, the settings in the menu can be performed in any order. As shown in FIG. 13, faxes received by the facsimile machine F will be forwarded to the destination number beginning at 5:29:01 PM on Jun. 6, 1999, and will stop being forwarded at 5:29:01 PM on Jun. 7, 1999. No further intervention by the user s necessary to start or stop forwarding. Although as shown in FIG. 13 the start an stop times and dates are specified as absolute times and dates, relative times and (rates can be used. For example, a start date could be specified as "tomorrow" or "Monday" and a stop time could be specified as "2 hours." Any combination of relative and absolute times and dates can be used, and relative times for the stop time and date can be specified as relative to the current time and date or to the start time an( date.

Finally, as shown in window 1370, the local printing feature is turned off. The facsimile machine will forward faxes during the specified time period without printing a copy. If the local print feature were turned on, each fax forwarded would also be printed at the local printer, providing a copy even if the fax failed to be successfully forwarded because of problems such as a failure of the remote facsimile machine.

Figures 12, 14:
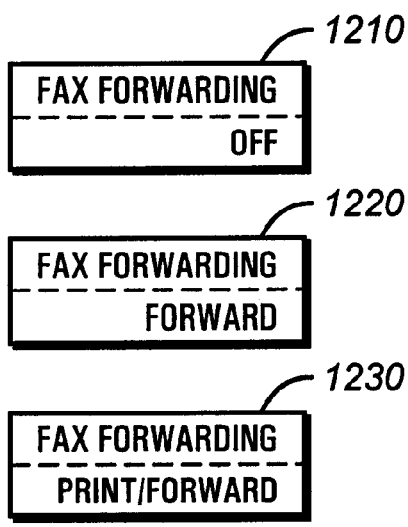
FIG. 12 is a series of pictures of the control panel of the exemplary facsimile machine F of FIG. 2 showing the state of fax forwarding.
FIG. 14 is series pseudocode elements showing the effect of setting the start time and date and the stop time and date on the state of fax forwarding.

FIG. 14 provides three exemplary pseudocode elements that describe the effect of setting the start time ad date and stop time and date for forwarding. Steps 1410–1430 are executed to determine the fax forwarding state of the fax machine F. In element 1410, the start time and date are set to a time in the future, compared to the current date and time stored i the facsimile machine F. Further, the start time and date precede the stop time and date. In this case, fax forwarding state is set to Future, indicating that forwarding will begin (and end) at some point in the future.

In element 1420, the start time and date are set to a point in the past, but prior to the stop time and date. In this case, the fax forwarding state is set to On, indicating that the facsimile machine F is currently forwarding faxes.

Finally, in element 1430, if the stop time and date are set prior to the current time and date or the start time and date are set to a time after the stop time and date, the fax forwarding state is set to Off. With these settings, there is no valid time and date remaining during which fax forwarding is to be performed.

CONCLUSION

With remote fax forwarding control, a user may activate fax forwarding when the user is away from his home or office from essentially anywhere in the world. In this way, a user may remotely enable faxes at his normal number to be forwarded to another fax number of choice For example, a user might forward faxes from his normal fax number to a fax lumber for a facsimile machine in his hotel room or another office where the user is located. Even if a user travels from one location away from the home or the office to another location that is also away from the home or office, the user may remotely activate fax forwarding to a fax number at the user's current location. In effect, faxed information can follow the user wherever the user goes. The user may also remotely control when and how fax information is forwarded to the user.

A facsimile machine as used herein generally refers to any machine with facsimile functionality including, but not limited to, (i) multifunctional peripherals, (ii) an all-in-one printer, facsimile machine, copier and scanner and (iii) a standalone facsimile machine. A process or as used herein generally refers to any device that handles processing or control functions including, but not limited to, a general processor, a digital signal processor and a controller. Firmware as used herein generally refers to program cod, or "hard software" stored in a non-volatile memory.

The foregoing disclosure and description are illustrative and explanatory thereof, and various changes in the details of the interfaces to facsimile machines, types of facsimile machines, the storage scheme for faxes, and techniques for remotely communicating with facsimile machines, as well as the illustrated apparatus and construction and method of operation may be made without departing from the spirit of the invention.

We claim:

1. A facsimile machine, comprising:
   a processor;
   a communication interface coupled to the processor;
   a fax modem coupled to the processor; and
   a non-volatile memory coupled to the processor, the non-volatile memory comprising:
   fax forwarding firmware executable by the processor to detect a remote fax forwarding activate command and remotely activate fax forwarding in response to the remote fax forwarding activate command,
   wherein faxes received by the facsimile machine while the fax forwarding is activated are forwarded to a destination, and
   wherein faxes received by the facsimile machine while the fax forwarding is deactivated are not forwarded to the destination.

2. The facsimile machine of claim 1, wherein the fax forwarding firmware detects a remote fax forwarding deactivate command and remotely deactivates fax forwarding in response to the remote fax forwarding deactivate command.

3. The facsimile machine of claim 1, wherein the fax forwarding firmware sets a predetermined activation time to activate the fax forwarding.

4. The facsimile machine of claim 3, wherein the predetermined activation time is a relative time.

5. The facsimile machine of claim 1, wherein the fax forwarding firmware sets a predetermined deactivation time to deactivate the fax forwarding.

6. The facsimile machine of claim 5, wherein the predetermined deactivation time is a relative time.

7. The facsimile machine of claim 1, wherein the fax forwarding firmware remotely activates fax forwarding with local printing.

8. The facsimile machine of claim 1, wherein the remote fax forwarding activate command is remotely provided to the facsimile machine through an email.

9. The facsimile machine of claim 1, wherein the remote fax forwarding activate command is remotely provided to the facsimile machine through a predetermined sequence of tones from a telephone.

10. The facsimile machine of claim 1, wherein the remote fax forwarding activate command is remotely provided to the facsimile machine through voice recognition.

11. The facsimile machine of claim 1, wherein the remote fax forwarding activate command is remotely provided to the facsimile machine through a fax.

12. The facsimile machine of claim 1, wherein the non-volatile memory stores fax forwarding numbers associated with the fax forwarding.

13. A method of facsimile forwarding for a facsimile machine, the method comprising the steps of:
   detecting a remote fax forwarding activate command to activate fax forwarding for a facsimile machine; and
   remotely activating fax forwarding in response to the fax forwarding activate command,
   wherein faxes received by the facsimile machine while the fax forwarding is activated are forwarded to a destination, and
   wherein faxes received by the facsimile machine while the fax forwarding is deactivated are not forwarded to the destination.

14. The method of claim 13, wherein the remote fax forwarding activate command is remotely provide to the facsimile machine through voice recognition.

15. The method of claim 14, further comprising the steps of:
   detecting a remote fax forwarding deactivate command to deactivate the fax forwarding; and
   remotely deactivating the fax forwarding in response to the fax forwarding deactivate command.

16. The method of claim 14, further comprising the step of:
   setting a predetermined activation time to activate the fax forwarding.

17. The method of claim 16, wherein the predetermined activation time is a relative time.

18. The method of claim 14, further comprising the step of:
   setting a predetermined deactivation time to deactivate the fax forwarding.

19. The method of claim 18, wherein the predetermined deactivation time is a relative time.

20. The method of claim 14, the step of remotely activating fax forwarding comprising the step of:
   remotely activated fax forwarding with local printing.

21. The method of claim 13, wherein the remote fax forwarding activate command is remotely provide to the facsimile machine through a fax.

22. The method of claim 14, wherein the facsimile machine is a multifunctional peripheral.

23. The method of claim 14, wherein the remote fax forwarding activate command is remotely provided to he facsimile machine through an email.

24. The method of claim 14, wherein the remote fax forwarding activate command is remotely provided to the facsimile machine through a predetermined sequence of tones from a telephone.

25. A facsimile machine, comprising:
   a processor;
   a communicate on interface coupled to the processor;
   a fax modem coupled to the processor; and
   a non-volatile memory coupled to the processor, the non-volatile memory comprising:
      a means for detecting a remote fax forwarding activate command to activate fax forwarding; and
      a means for remotely activating fax forwarding in response to the fax forwarding activate command,
   wherein faxes received by the facsimile machine while the fax forwarding is activated are forwarded to a destination, and
   wherein faxes received by the facsimile machine while the fax forwarding is deactivated are not forwarded to the destination.

26. The facsimile machine of claim 25, the non-volatile memory further comprising:
   a means for se mg a predetermined deactivation time to deactivate the fax forwarding.

27. The facsimile machine of claim 26, wherein the predetermined deactivation time is a relative time.

28. The facsimile machine of claim 25, the non-volatile memory further comprising:
   a means for detecting a remote fax forwarding deactivate command to deactivate the fax forwarding; and
   a means for remotely deactivating the fax forwarding in response to the fax forwarding deactivate command.

29. The facsimile machine of claim 25, the non-volatile memory further comprising:
   a means for setting a predetermined activation time to activate the fax forwarding.

30. The facsimile machine of claim 29, wherein the predetermined activation time is a relative time.

31. The facsimile machine of claim 25, the means for remotely activating the fax forwarding comprising:
   a means for remotely activating fax forwarding with local printing.

* * * * *